US009086141B2

(12) United States Patent
Neelakantan et al.

(10) Patent No.: US 9,086,141 B2
(45) Date of Patent: Jul. 21, 2015

(54) ACCELERATION-BASED STATE CONTROL OF A BINARY CLUTCH ASSEMBLY

(71) Applicant: GM GLOBAL TECHNOLOGY OPERATIONS LLC, Detroit, MI (US)

(72) Inventors: Vijay A. Neelakantan, Rochester Hills, MI (US); John E. Marano, Milford, MI (US); Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 13/664,459

(22) Filed: Oct. 31, 2012

(65) Prior Publication Data
US 2014/0121914 A1 May 1, 2014

(51) Int. Cl.
*B60W 10/06* (2006.01)
*B60W 10/02* (2006.01)
*F16H 61/04* (2006.01)
*F16H 59/48* (2006.01)
*F16H 61/684* (2006.01)

(52) U.S. Cl.
CPC ............ *F16H 61/0437* (2013.01); *F16H 59/48* (2013.01); *F16H 61/684* (2013.01); *F16H 2061/044* (2013.01)

(58) Field of Classification Search
None
See application file for complete search history.

(56) References Cited

U.S. PATENT DOCUMENTS

| | | | | |
|---|---|---|---|---|
| 4,228,700 A * | 10/1980 | Espenschied et al. | ........ | 477/154 |
| 5,403,249 A * | 4/1995 | Slicker | .......... | 477/176 |
| 8,029,403 B2 * | 10/2011 | Lee et al. | ...... | 475/276 |
| 2005/0234624 A1 * | 10/2005 | Matsushima et al. | ........... | 701/51 |
| 2007/0099754 A1 * | 5/2007 | Yamaguchi et al. | ............ | 477/44 |
| 2007/0099758 A1 * | 5/2007 | Maguire et al. | ................ | 477/175 |
| 2008/0223681 A1 * | 9/2008 | Stevenson et al. | ............. | 192/43 |
| 2010/0063698 A1 * | 3/2010 | Lee et al. | ......... | 701/67 |
| 2010/0250088 A1 * | 9/2010 | Grolle et al. | ..................... | 701/96 |
| 2011/0011694 A1 * | 1/2011 | Swales et al. | ................. | 192/48.2 |
| 2011/0183806 A1 * | 7/2011 | Wittkopp et al. | ............. | 475/263 |
| 2012/0145506 A1 * | 6/2012 | Samie et al. | ..................... | 192/46 |
| 2012/0184405 A1 * | 7/2012 | Morimura et al. | ............. | 477/54 |
| 2012/0247902 A1 * | 10/2012 | Moorman | .................... | 192/3.58 |
| 2014/0163802 A1 * | 6/2014 | Tokai | .............................. | 701/22 |

* cited by examiner

*Primary Examiner* — Yonel Beaulieu
*Assistant Examiner* — Krishnan Ramesh
(74) *Attorney, Agent, or Firm* — Quinn Law Group, PLLC

(57) ABSTRACT

A vehicle includes an engine and transmission having gear sets, an input member that is continuously connected to the engine and a gear set, a binary clutch assembly, a speed sensor, and a controller. The binary clutch assembly includes a freewheeling element holding torque in one rotational direction, and also a selectable one-way clutch (SOWC) portion holding torque in two rotational directions when applied. The controller executes a method to transmit a first binary clutch command to the binary clutch assembly and thus apply the SOWC portion at vehicle launch, and calculates, via the processor, an acceleration value of the vehicle using the measured speed. The controller also selects a shift apply point of the binary clutch assembly as a function of the calculated acceleration value, and transmits a second binary clutch command to the binary clutch assembly to release the SOWC portion at the selected shift apply point.

20 Claims, 2 Drawing Sheets

ACCELERATION-BASED STATE CONTROL OF A BINARY CLUTCH ASSEMBLY

TECHNICAL FIELD

The disclosure relates to acceleration-based state control of a binary clutch assembly.

BACKGROUND

A motor vehicle transmission typically couples rotatable transmission input and output members using interconnected gear elements and clutches to thereby establish a desired transmission output speed ratio. Some of the clutches may be configured as fluid-actuated plate clutches having a series of spaced friction plates. A hydraulic piston is typically actuated to compress the friction plates together and thereby transfer torque across the engaged clutch, or to stop rotation of a side of the clutch and any interconnected gear elements or nodes. Plate clutches are typically controlled with a variable rate of slip, such that the state of the plate clutch can range from fully-applied to fully-released and anywhere in between.

In some transmissions, a binary clutch assembly, such as a selectable one-way clutch (SOWC) portion and freewheeling element, is used alone or in conjunction with a plate clutch to establish one or more gear states. Such devices may be applied in first gear to launch the vehicle or during a rolling garage shift into reverse. Unlike conventional friction plate clutches, a binary clutch assembly, as the name indicates, has just two possible clutch states: a fully-applied state and a fully-released state, as determined by the commanded state of the SOWC portion. When the SOWC portion is released, the binary clutch assembly is released, and thus freewheels in one rotational direction. The freewheeling element prevents rotation in the other rotational direction. Therefore, one side of the binary clutch assembly may effectively slip with respect to the other side. When the SOWC portion is applied, however, the binary clutch assembly is effectively locked in both rotational directions.

SUMMARY

A vehicle is disclosed herein that includes a transmission with a binary clutch assembly. The transmission receives input torque from an engine or another prime mover, and includes one or more gear sets, at least one node of which is connected to the binary clutch assembly. The binary clutch assembly may be any torque transfer device having the two states noted above: fully-applied and fully-released, i.e., any binary device characterized by an absence of any partially-applied states. A controller of the transmission is in communication with the binary clutch assembly and with at least one vehicle speed sensor. The controller automatically selects a variable shift apply point, which is a corresponding vehicle speed, suitable for changing the state of the binary clutch assembly from a locked mode to a freewheeling mode.

In the present transmission, the binary clutch assembly has a binary state of applied/locked as the vehicle is launched in $1^{st}$ gear. This binary state allows the possibility of shifting the transmission into reverse during a rolling garage shift. However, a selectable one-way clutch (SOWC) portion of the binary clutch assembly must be in a released/freewheeling state to allow a smooth shift from $1^{st}$ gear into $2^{nd}$ gear. The present control approach thus provides for selection of a variable shift apply point based on vehicle acceleration, which is intended to facilitate the transition from an applied state in $1^{st}$ gear, also referred to herein as $1^{st}$ gear locked, to a released state, i.e., a $1^{st}$ gear freewheeling mode.

Underlying the present control approach is the recognition that if vehicle acceleration is high during $1^{st}$ gear launch, the likelihood of a driver commanding a shift to reverse is minimal relative to when vehicle acceleration is low. The likelihood of a rapid shift into $2^{nd}$ gear is higher, and thus the SOWC portion is disengaged sooner. The present control approach attempts to achieve a balanced tradeoff between these potentially contradictory state requirements of the binary clutch assembly, and thus may improve the quality of a shift to reverse during a rolling garage shift as well as to $2^{nd}$ gear from $1^{st}$ gear soon after vehicle launch.

In particular, a vehicle is disclosed herein that includes an internal combustion engine and a transmission. The transmission includes a plurality of gear sets each having a plurality of nodes, an input member that is continuously connected to the engine and to one of the gear sets, a binary clutch assembly, and a controller. The binary clutch assembly, which may be connected to the same gear set as the input member, includes a freewheeling element and a selectable one-way clutch (SOWC) portion. The controller transmits a first binary clutch command to the binary clutch assembly to lock the SOWC portion in both rotational directions when the vehicle is launched, then calculates, via a processor, an acceleration value of the vehicle as the vehicle accelerates starting from $1^{st}$ gear after launch. The controller also selects a shift apply point of the binary clutch assembly in a variable manner as a function of the calculated acceleration value, and releases the SOWC portion at the selected shift apply point.

A method is also disclosed that includes transmitting a first binary clutch command from a controller of a vehicle to the binary clutch assembly to thereby lock the SOWC portion in both rotational directions when the vehicle is launched in $1^{st}$ gear. The method additionally includes calculating, via the controller, an acceleration value of the vehicle as the vehicle accelerates after launch from $1^{st}$ gear, and automatically selecting a shift apply point of the binary clutch assembly as a function of the calculated acceleration value. A second binary clutch command is transmitted as part of the method to the binary clutch assembly to thereby release the SOWC portion at the selected shift apply point.

The above features and the advantages of the present disclosure are readily apparent from the following detailed description of the best modes for carrying out the invention when taken in connection with the accompanying drawings.

DETAILED DESCRIPTION

Figure 1:
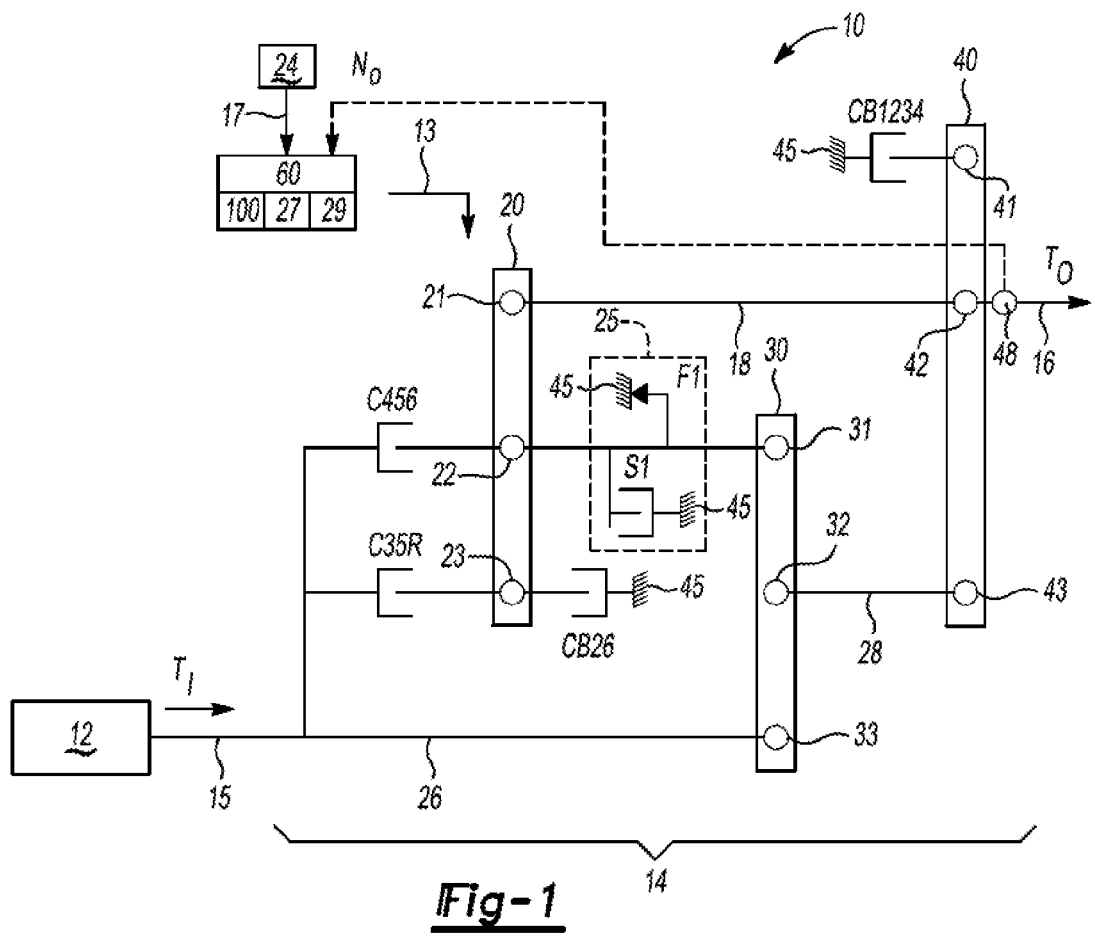
FIG. 1 is a schematic illustration of an example vehicle having an automatic transmission with a binary clutch assembly controlled as disclosed herein.

Referring to the drawings, an example vehicle 10 is shown schematically in FIG. 1 having an internal combustion engine 12 and/or another prime mover and an automatic transmission 14. The transmission 14 includes a binary clutch assembly 25, and is represented as a schematic lever diagram, as is well understood by those having ordinary skill in the art. The control approach that is disclosed herein may be used with any transmission design that uses a binary device such as the binary clutch assembly 25 in order to achieve $1^{st}$ gear vehicle launch, a rolling garage shift to reverse, and a $1^{st}$ gear to $2^{nd}$ gear upshift. Therefore, the transmission 14 is just one possible configuration.

Regardless of how the transmission 14 is configured, at least one node of the transmission 14 is connected to the binary clutch assembly 25. A controller 60 is in communication with the binary clutch assembly 25 and with at least one vehicle speed sensor, which is shown in FIG. 1 as a conventional transmission output speed sensor (TOSS) 48, but which may include one or more wheel speed sensors or any other suitable speed sensor(s). Using the measured vehicle speed, in this example a transmission output speed (arrow $N_O$) from the TOSS 48, the controller 60 calculates an instantaneous acceleration value ($\alpha$), e.g., as the rate of change of the transmission output speed (arrow No), with $$\alpha = \frac{d}{dt} N_O$$

in this example approach.

The controller 60 of FIG. 1 then selects a variable shift apply point, which is a corresponding vehicle speed, for application of the binary clutch assembly 25, doing so as a linear or other calibrated function of the calculated acceleration value ($\alpha$). The controller transmits a binary control signal (arrow 13) to the binary clutch assembly 25 at the selected shift apply point. Upon receipt of the binary clutch control signal (arrow 13), actuators of the binary clutch assembly 25 release a selectable one-way clutch (SOWC) portion S1 of the binary clutch assembly 25 as needed to enter or exit a transmission gear state or mode. At launch, the controller 60 may transmit the binary control signal (arrow 13) with a different value to apply the SOWC portion S1. Selection of the shift apply point from a range of possible points is described in further detail below with reference to FIGS. 2-3. An example method 100 for executing the present control approach is described below with reference to FIG. 4.

The controller 60 shown schematically in FIG. 1 may be embodied as a digital computer device or multiple such devices in communication with the engine 12 and with a PRNDL (park, reverse, neutral, drive, low) valve 24. The controller 60 thus receives, either directly or via an engine or separate transmission control module (not shown), a PRNDL setting (arrow 17) and the measured vehicle speed, e.g., the transmission output speed (arrow $N_O$) from the TOSS 48. Structurally, the controller 60 may include at least one microprocessor 27 along with sufficient tangible, non-transitory memory 29, e.g., read-only memory (ROM), flash memory, optical memory, additional magnetic memory, etc. The controller 60 may also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 for changing the state of the binary clutch assembly 25 are recorded in memory 29 and executed as needed via the processor(s) 27.

The example transmission 14 of FIG. 1 may include an input member 15 and output member 16. The respective input and output members 15 and 16 are selectively connected to each other at a desired speed ratio via one or more gear sets. In the embodiment of FIG. 1, the transmission 14 is shown as an example 6-speed automatic transmission having three planetary gear sets, i.e., a first gear set 20, a second gear set 30, and a third gear set 40. However, as noted above other configurations may be used without departing from the intended inventive scope. Input torque (arrow $T_I$) from the engine 12 or another prime mover, such as an electric traction motor, is transferred through the transmission 14 such that output torque (arrow $T_O$) is ultimately transferred to the output member 16, and thereafter to the drive axles and drive wheels (not shown).

The first gear set 20 of FIG. 1 may include first, second, and third nodes 21, 22, and 23, respectively. The second and third gear sets 30 and 40 may likewise have respective first, second, and third nodes. For the second gear set 30, the first, second, and third nodes are nodes 31, 32, and 33, respectively. The third gear set 40 includes respective first, second, and third nodes 41, 42, and 43.

With respect to the first gear set 20, the first node 21 is continuously connected to the second node 42 of the third gear set 40 via an interconnecting member 18. The second node 22 is selectively connected to the engine 12 and the input member 15 via a first rotating clutch C456. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. Engagement of the binary clutch assembly 25 locks the nodes 22 and 31 to a stationary member 45 of the transmission 14. The second node 32 is continuously connected to the third node 43 of the third gear set 40 via another interconnecting member 28. The third node 33 is continuously connected to the input member 15 directly or via another interconnecting member 26. The first node 41 of the third gear set 40 is selectively connected to the stationary member 45 via a second braking clutch CB1234. An optional transmission output speed sensor 48 may be positioned with respect to the output member 16, with the measured output speed (arrow $N_O$) relayed as an additional control signal to the controller 60.

The vehicle 10 of FIG. 1 may use the binary clutch assembly 25 when shifting to a reverse gear state, e.g., during a rolling garage shift as that term is known in the art, and when shifting from $1^{st}$ gear to $2^{nd}$ gear. The binary clutch assembly 25 is typically in an off/released state and thus freewheeling in one rotational direction in all gear states above $2^{nd}$ gear in order to reduce slip losses in these higher gears. The binary clutch assembly 25 has two parts as shown in FIG. 1: a passive one-way clutch or freewheeling element F1 that allows rotation of the node connected to it, such as node 31 of the second gear set 30, in only rotational direction, and the SOWC portion S1. The SOWC portion S1 is selectively applied to prevent rotation in both rotational directions. Hence, by applying the SOWC portion S1, any nodes connected to the SOWC portion S1 are effectively grounded to the stationary member 45. Grounding typically occurs during reverse and while engine braking in $1^{st}$ gear.

Figure 2:
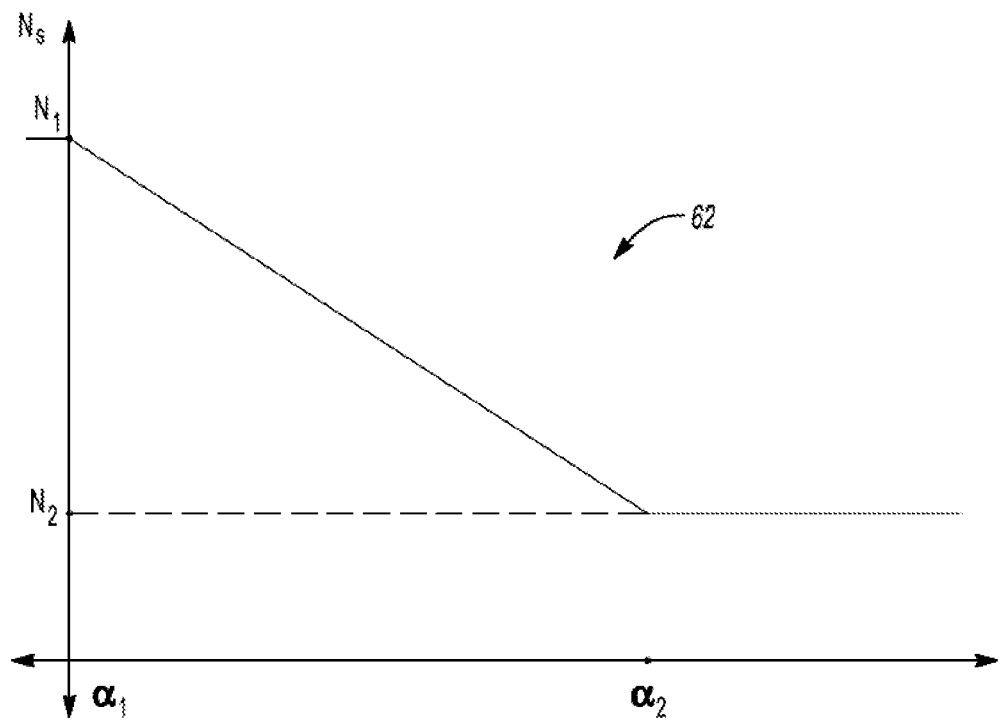
FIG. 2 is a plot of an example shift apply point trace, with vehicle acceleration and shift apply point depicted on the horizontal axis and the vertical axis, respectively.

Referring to FIG. 2, the state of the binary clutch assembly 25 of FIG. 1 is fully-on/applied as the vehicle 10 is launched in $1^{st}$ gear. This anticipates the possibility of a requested shift into reverse, e.g., a rolling garage shift. The binary clutch assembly 25 is fully-off/released in response to a requested 1-2 upshift to allow a smooth transition into $2^{nd}$ gear. The controller 60 of FIG. 1 handles this potentially conflicting state requirement by selecting the shift apply point for the binary clutch assembly 25 based on the calculated acceleration value ($\alpha$) of the vehicle 10. That is, as the vehicle accelerates a faster rate, the binary clutch assembly 25 is released sooner relative to a slower acceleration rate. When the vehicle decelerates, the controller 60 of FIG. 1 may use static shift apply points to return the transmission 14 to $1^{st}$ gear, as explained below with reference to FIG. 3.

Trace 62 of FIG. 2 illustrates this concept. The acceleration value ($\alpha$) is plotted on the horizontal axis, and the vehicle speed (N) that defines each shift apply point is plotted on the vertical axis for a shift from a $1^{st}$ gear locked state, wherein the SOWC portion S1 of FIG. 1 is fully applied, to a $1^{st}$ gear freewheeling state in which the same SOWC portion S1 is fully released. At a relatively low acceleration value ($\alpha_1$), a shift of the SOWC portion S1 from a $1^{st}$ gear locked state is enabled by the controller 60 of FIG. 1 at a calibrated maximum vehicle speed ($N_1$). For example, a vehicle speed of 10-15 kilometers per hour (kph) may be permitted in a possible embodiment.

As vehicle acceleration increases to a relatively high vehicle instantaneous acceleration value ($\alpha_2$), the controller 60 gradually lowers the permissible vehicle speed to a calibrated minimum vehicle speed ($N_2$). This transition may occur linearly in one embodiment, as shown in FIG. 2. For example, the shift apply point may vary linearly from 10-15 kph, i.e., about 12 kph, at vehicle speed ($N_1$), dropping to 2-5 kph, i.e., about 4 kph, at vehicle speed ($N_2$). The speed range [$N_1$, $N_2$] defines the respective maximum and minimum boundaries of a variable shift window for the binary clutch assembly 25 of FIG. 1.

Figure 3:
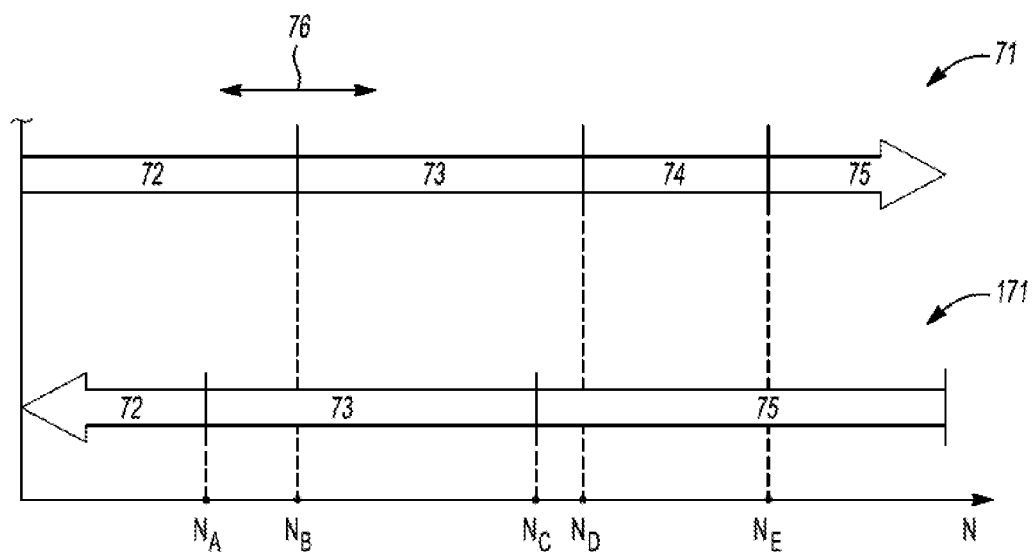
FIG. 3 is a schematic illustration of possible state transition paths for the binary clutch assembly shown in FIG. 1.

Referring to FIG. 3, the core concept of the present acceleration-based shift apply point control provided via operation of the controller 60 shown in FIG. 1 is illustrated schematically via respective first and second transition paths 71 and 171. The first transition path 71, which illustrates a transition from $1^{st}$ gear locked to $2^{nd}$ gear, is divided into four states: states 72, 73, 74, and 75. The second transition path 171 illustrates a transition in the opposite direction, i.e., from $2^{nd}$ gear to $1^{st}$ gear locked, and is divided into just three states: states 72, 74, and 75. For both transition paths, state 72 is $1^{st}$ gear locked, state 74 is $1^{st}$ gear freewheeling, and state 75 is $2^{nd}$ gear. State 73 of the first transition path 71 represents a variable state in which the SOWC portion S1 of FIG. 1 may or may not be engaged, with the actual status depending on the instantaneous acceleration value ($\alpha$) of the vehicle 10.

The variable nature of state 73 is indicated in FIG. 3 by a double-headed arrow 76. Because the actual binary state of the binary clutch device 25 is always either applied or released, state 73 is in actuality a type of "pseudo-state", i.e., some or all of the duration of state 73 is assigned to state 72 or 74 depending on the instantaneous acceleration value ($\alpha$). Likewise, state 75 is effectively a continuation of state 74 in terms of the corresponding binary state of the binary clutch assembly 25, as after the binary clutch assembly 25 is released, it remains released for all higher gear states.

The acceleration-based control of the present invention works in conjunction with calibrated speed thresholds. The speed threshold changes as a function of instantaneous acceleration value ($\alpha$), unlike conventional approaches which use static shift apply points in the form of fixed speeds. The first transition path 71 thus begins in state 72 at zero output speed and continues in this state until the vehicle 10 of FIG. 1 reaches a higher speed $N_B$, e.g., about 6 kph in one embodiment. State 72 may end at a speed as low as $N_B$ and as high as $N_D$, e.g., about 12 kph in the same embodiment, with the actual termination of state 72 calculated by the controller 60 as a function of the instantaneous acceleration value ($\alpha$) as explained above with reference to FIG. 2.

No later than speed $N_D$, the SOWC portion S1 of FIG. 1 is released via the binary control signals (arrow 13 of FIG. 1) and remains released thereafter at all higher gear states in order to minimize losses. State 74, i.e., $1^{st}$ gear locked, may continue until speed $N_E$, e.g., about 15 kph, at which point the transmission 14 may be automatically shifted into $2^{nd}$ gear or state 75. The example speeds provided herein may vary depending on the design.

The second transition path 171 illustrates changing vehicle speed in the opposite direction. That is, state 75 ($2^{nd}$ gear) may be maintained until a speed $N_C$, e.g., about 12 kph, at which point a state shift occurs to state 73 ($1^{st}$ gear freewheeling). State 73 may continue until the vehicle 10 reaches a speed $N_A$, at which point a shift may occur to state 72 ($1^{st}$ gear locked). Note that second transition path 171 lacks state 73, which is used as a variable state only when the vehicle 10 of FIG. 1 is accelerating in the positive speed direction, i.e., when the vehicle 10 is not decelerating.

Figure 4:
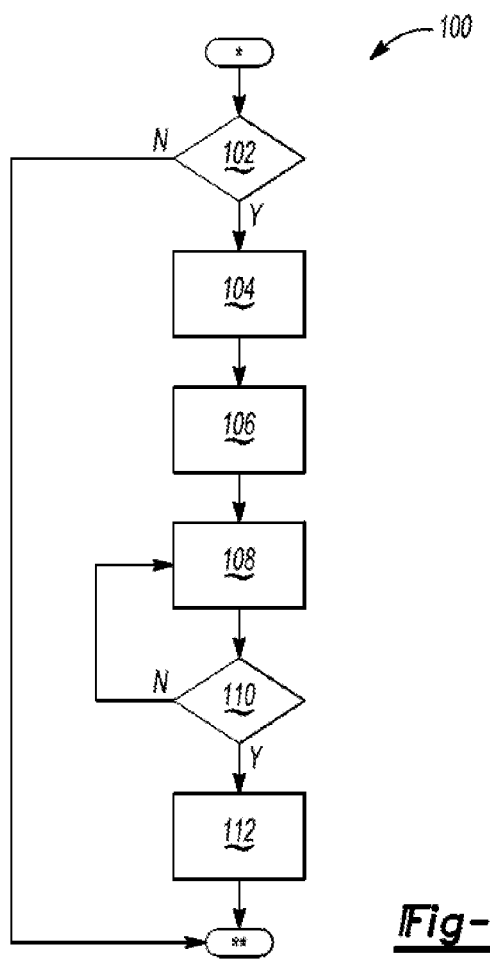
FIG. 4 is a flow chart describing an example method for controlling the state of the binary clutch assembly as a function of vehicle acceleration.

FIG. 4 illustrates an example method 100 for controlling the state of a binary device, e.g., for controlling the on/off state of the example binary clutch assembly 25 shown in FIG. 1, using the instantaneous acceleration value ($\alpha$) of the vehicle 10 shown in the same Figure. After initialization (*), the method 100 commences with step 102, wherein the controller 60 of FIG. 1 determines whether the transmission 14 is presently at zero output speed and in state 72 of FIG. 3, i.e., in a $1^{st}$ gear locked state. If not, the method 100 proceeds to step 112. Otherwise, the method 100 proceeds to step 104.

At step 104, the controller 60 receives and processes the transmission output speed (arrow $N_O$ of FIG. 1) or another measured speed value using the processor 27. Step 104 may entail filtering the signal from the TOSS 48 and/or from any other speed sensor(s) used to determine vehicle speed, e.g., a set of wheel speed sensors (not shown). The method 100 proceeds to step 106 once the vehicle speed is known.

Step 106 includes calculating, via the processor 27 of FIG. 1, the instantaneous acceleration value ($\alpha$) of the vehicle 10 shown in the same Figure, such as by calculating the derivative or rate of change of the vehicle speed determined previously at step 104. The instantaneous acceleration value ($\alpha$) is recorded temporarily in memory 29 of the controller 60, after which the method 100 proceeds to step 108.

At step 108, the controller 60 shown in FIG. 1 next selects a shift apply point from state 72 ($1^{st}$ gear locked) into state 74 ($1^{st}$ gear freewheeling). In effect, step 108 entails determining how much of the duration of the variable state 73 to add to state 72 or state 74. In selecting the shift apply point at step 108, the controller 60 may access a lookup table that is recorded in memory 29 as a calibration value, with the lookup table indexed by acceleration and vehicle speed. The controller 60 commands a shift of the SOWC portion S1 shown in FIG. 1 at the selected shift apply point to thereby request a shift into a released/off state. The method then proceeds to step 110.

Step 110 may include determining whether the SOWC portion S1 of FIG. 1 is fully released, such as by measuring or calculating the amount of slip across the SOWC portion S1. If the controller 60 determines that the SOWC portion S1 is fully-released, the method 100 proceeds to step 112. Otherwise, the method 100 repeats step 108.

At step 112, the controller 60 proceeds to control the transmission 14 through shifts to any requested higher gears, or from a higher gear to a lower gear as needed. In all higher gears, which includes any gears including or above $2^{nd}$ gear depending on the embodiment, the SOWC portion S1 remains off/disengaged to minimize losses. The method 100 is then finished (**).

The variable shift apply point provided herein is intended to solve certain performance issues related to control methods which use static shift apply points. For instance, during a high-acceleration vehicle launch up to a threshold vehicle speed, followed immediately by a brief removal of apply pressure to accelerator pedal and subsequent throttle increase, present approaches must wait for the SOWC portion of a binary device to disengage. At the same time, the struts or other torque holding pieces of the SOWC portion are fully-loaded. This can delay the requested shift and compromise shift quality.

Likewise, moving a shift apply point lower, i.e., shifting a binary device at a lower vehicle speed, may result in denying a requested garage shift to reverse until a vehicle having the binary device has slowed to a sufficiently low threshold, usually 4 kph or less. Other maneuvers that may benefit from the present approach may include a forward-reverse vehicle rock cycle of the type commonly used in attempts to extricate a vehicle from snow, ice, or mud.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine; and
   a transmission having:
      a stationary member;
      a plurality of gear sets each having a plurality of nodes;
      an input member that is continuously connected to the engine and to one of the gear sets;
      a binary clutch assembly that is connected to the same gear set as the input member, wherein the binary clutch assembly includes a freewheeling element holding torque in a first rotational direction and a selectable one-way clutch (SOWC) portion that connects the SOWC portion to the stationary member when applied to hold torque in the first rotational direction and in a second rotational direction, and that allows the binary clutch assembly to freewheel in the second rotational direction when released;
      a speed sensor operable to measure a speed of the vehicle; and
      a controller in communication with the binary clutch assembly and with the speed sensor, wherein the controller includes a processor and memory with recorded instructions for selecting a shift apply point of the binary clutch assembly, and wherein the controller is configured to execute the instructions from memory via the processor to thereby:
         transmit a first binary clutch command to the binary clutch assembly to thereby apply the SOWC portion when the vehicle is launched;
         calculate, via the processor, an acceleration value of the vehicle as a function of the measured speed of the vehicle;
         select a shift apply point of the binary clutch assembly as a function of the calculated acceleration value; and
         transmit a second binary clutch command to the binary clutch assembly to thereby release the SOWC portion at the selected shift apply point.

2. The vehicle of claim 1, wherein the transmission includes a first and a second gear set, and wherein the binary clutch assembly is connected between nodes of the first and second gear sets.

3. The vehicle of claim 1, wherein the controller includes a recorded lookup table, and wherein the processor accesses the recorded lookup table using the calculated acceleration value to thereby select the shift apply point.

4. The vehicle of claim 1, wherein the shift apply point is linearly variable within a calibrated speed range.

5. The vehicle of claim 4, wherein the calibrated speed range is 4-12 kilometers per hour.

6. The vehicle of claim 1, wherein the transmission includes an output member, and wherein the speed sensor is a transmission output speed sensor positioned with respect to the output member and configured to measure, as the speed of the vehicle, the rotational speed of the output member.

7. The vehicle of claim 1, wherein:
   the transmission includes an output member and the plurality of gear sets includes a first gear set, a second gear set, and a third gear set;
   the binary clutch assembly is connected between a node of the first gear set and a node of the second gear set; and
   the output member is connected to a node of the third gear set.

8. The vehicle of claim 1, wherein the controller is configured to reapply the SOWC portion at a calibrated fixed shift apply point when the vehicle decelerates.

9. A method comprising:
   transmitting a first binary clutch command from a controller of a vehicle to the binary clutch assembly when the vehicle is launched to apply a selectable one-way clutch (SOWC) portion of the binary clutch assembly, connect the SOWC portion to a stationary member of a transmission, and thereby prevent rotation of the binary clutch assembly in two rotational directions;
   calculating, via the controller, an acceleration value of the vehicle as the vehicle accelerates;
   selecting a shift apply point of the binary clutch assembly as a function of the calculated acceleration value; and
   transmitting a second binary clutch command to the binary clutch assembly to thereby release the SOWC portion at the selected shift apply point, and thereby allow the binary clutch assembly to freewheel in one of the two rotational directions.

10. The method of claim 9, wherein the controller includes a recorded lookup table, and wherein the processor is operable to access the lookup table using the calculated acceleration value to thereby select the shift apply point.

11. The method of claim 9, further comprising:
    linearly varying the shift apply point via the controller within a calibrated speed range based on the calculated acceleration value.

12. The method of claim 11, wherein linearly varying the shift apply point includes linearly increasing the shift apply point between 4-12 kilometers per hour as the vehicle accelerates.

13. The method of claim 9, wherein the transmission includes an output member and a transmission output speed sensor (TOSS) positioned with respect to the output member in communication with the processor, the method further comprising:

measuring an output speed of the transmission via the TOSS;

receiving the measured output speed via the controller; and calculating, via the processor, the acceleration value as a function of the measured output speed.

14. The method of claim 9, further comprising:
reapplying the binary clutch assembly at a calibrated fixed shift apply point when the vehicle again decelerates.

15. A transmission comprising:
a stationary member;
first and second gear sets;
a binary clutch assembly connected to the first and second gear sets, wherein the binary clutch assembly includes a selectable one-way clutch (SOWC) portion;
a speed sensor configured to measure an output speed of the transmission; and
a controller in communication with the speed sensor and with the binary clutch assembly, wherein the controller includes a processor and tangible, non-transitory memory on which is recorded instructions for selecting a shift apply point of the binary clutch assembly, and wherein the controller is configured to execute the instructions from the memory to thereby:
transmit a first binary clutch command to the binary clutch assembly when a vehicle having the transmission is launched to thereby connect the SOWC portion to the stationary member, and thus prevent rotation of the binary clutch assembly in a first and a second rotational direction;
receive the measured output speed from the speed sensor;
calculate an acceleration value of the vehicle as a function of the measured output speed;
select the shift apply point of the binary clutch assembly as a function of the calculated acceleration value; and
transmit a second binary clutch command to the binary clutch assembly to thereby release the SOWC portion at the selected shift apply point such that the binary clutch assembly is allowed to freewheel in one of the first and second rotational directions.

16. The transmission of claim 15, wherein the controller includes a recorded lookup table, and wherein the processor accesses the lookup table using the calculated acceleration value to select the shift apply point.

17. The transmission of claim 15, wherein the shift apply point is linearly variable within a calibrated speed range.

18. The transmission of claim 17, wherein the calibrated speed range is 4 to 12 kph.

19. The transmission of claim 15, wherein:
the transmission includes an output member and the plurality of gear sets includes a first gear set, a second gear set, and a third gear set;
the binary clutch assembly is connected between a node of the first gear set and a node of the second gear set; and
the output member is connected to a node of the third gear set.

20. The transmission of claim 15, wherein the controller is configured to reapply the binary clutch assembly at a calibrated fixed shift apply point as the vehicle decelerates.

* * * * *